(12) United States Patent
Kamon (10) Patent No.: US 12,548,155 B2
(45) Date of Patent: Feb. 10, 2026

(54) MEDICAL IMAGE PROCESSING APPARATUS AND OPERATION METHOD THEREOF

(71) Applicant: FUJIFILM Corporation, Tokyo (JP)

(72) Inventor: Shumpei Kamon, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 375 days.

(21) Appl. No.: 18/297,402

(22) Filed: Apr. 7, 2023

(65) Prior Publication Data

US 2023/0245312 A1 Aug. 3, 2023

Related U.S. Application Data

(63) Continuation of application No. PCT/JP2021/032880, filed on Sep. 7, 2021.

(30) Foreign Application Priority Data

Oct. 9, 2020 (JP) .................................. 2020-171577

(51) Int. Cl.
*G06T 7/00* (2017.01)
*G06V 10/764* (2022.01)
(Continued)

(52) U.S. Cl.
CPC .......... *G06T 7/0012* (2013.01); *G06V 10/764* (2022.01); *G06V 10/82* (2022.01);
(Continued)

(58) Field of Classification Search
None
See application file for complete search history.

(56) References Cited

U.S. PATENT DOCUMENTS

2010/0182412 A1 7/2010 Taniguchi et al.
2016/0202895 A1 7/2016 Okumura et al.
(Continued)

FOREIGN PATENT DOCUMENTS

CN 105683889 A 6/2016
CN 106455947 A 2/2017
(Continued)

OTHER PUBLICATIONS

The extended European search report issued by the European Patent Office on Mar. 7, 2024, which corresponds to European Patent Application No. 21877295.2-1126 and is related to U.S. Appl. No. 18/297,402.
(Continued)

*Primary Examiner* — David Ometz
(74) *Attorney, Agent, or Firm* — Studebaker Brackett PLLC (57) ABSTRACT

A medical image processing apparatus includes: an image acquisition unit that acquires a plurality of medical images; an image classification unit that classifies the medical images into at least one of a plurality of categories; an image display unit that displays, on a screen, at least one of the plurality of medical images based on a result of the classification as an automatically selected image; an input receiving unit that receives an input from a user to select an image requiring reselection as a key image from among the displayed automatically selected images as a selected image; and a display control unit that switches and displays, as a switching image, a non-automatically selected image other than the automatically selected image among the plurality of medical images classified into each category, instead of displaying the selected image.

17 Claims, 11 Drawing Sheets

(51) Int. Cl.
    *G06V 10/82* (2022.01)
    *G06V 10/94* (2022.01)
    *G16H 30/40* (2018.01)

(52) U.S. Cl.
    CPC .......... *G06V 10/945* (2022.01); *G16H 30/40* (2018.01); *G06T 2207/10024* (2013.01); *G06T 2207/10068* (2013.01); *G06T 2207/20081* (2013.01); *G06T 2207/20084* (2013.01); *G06T 2207/20092* (2013.01); *G06T 2207/30096* (2013.01); *G06T 2207/30168* (2013.01); *G06V 2201/034* (2022.01)

(56) References Cited

U.S. PATENT DOCUMENTS

| | | | |
|---|---|---|---|
| 2017/0079506 A1 | 3/2017 | Nishiyama et al. | |
| 2018/0247107 A1 | 8/2018 | Murthy et al. | |
| 2019/0362835 A1* | 11/2019 | Sreenivasan | G06N 3/044 |
| 2020/0065614 A1 | 2/2020 | Nishimura | |
| 2020/0170492 A1 | 6/2020 | Kuramoto | |
| 2020/0184644 A1 | 6/2020 | Ueda | |
| 2020/0279368 A1 | 9/2020 | Tada et al. | |
| 2021/0065881 A1* | 3/2021 | Sargent | G16H 30/40 |
| 2021/0350906 A1* | 11/2021 | Janicki | G06F 3/0483 |
| 2021/0366110 A1 | 11/2021 | Oosake et al. | |

FOREIGN PATENT DOCUMENTS

| | | |
|---|---|---|
| CN | 111031889 A | 4/2020 |
| WO | 2009/008125 A1 | 1/2009 |
| WO | 2018/225448 A1 | 12/2018 |
| WO | 2019/039354 A1 | 2/2019 |
| WO | 2019/064704 A1 | 4/2019 |
| WO | 2020/183770 A1 | 9/2020 |

OTHER PUBLICATIONS

International Search Report issued in PCT/JP2021/032880; mailed Nov. 22, 2021.

International Preliminary Report On Patentability (Chapter I) and Written Opinion of the International Searching Authority issued in PCT/JP2021/032880; issued Mar. 28, 2023.

An Office Action; "Notice of Reasons for Refusal," mailed by the Japanese Patent Office on Aug. 12, 2025, which corresponds to Japanese Patent Application No. 2022-555314 and is related to U.S. Appl. No. 18/297,402; with English language translation.

An Office Action; mailed by the China National Intellectual Property Administration of the People's Republic of China on Jul. 10, 2025, which corresponds to Chinese Patent Application No. 202180068968.6 and is related to U.S. Appl. No. 18/297,402.

* cited by examiner

MEDICAL IMAGE PROCESSING APPARATUS AND OPERATION METHOD THEREOF

CROSS-REFERENCE TO RELATED APPLICATIONS

This application is a Continuation of PCT International Application No. PCT/JP2021/032880 filed on 7 Sep. 2021, which claims priority under 35 U.S.C § 119(a) to Japanese Patent Application No. 2020-171577 filed on 9 Oct. 2020. The above application is hereby expressly incorporated by reference, in its entirety, into the present application.

BACKGROUND OF THE INVENTION

1. Field of the Invention

The present invention relates to a medical image processing apparatus that acquires a key image picture for a report and an operation method thereof.

2. Description of the Related Art

In the medical field, a doctor diagnoses a patient while operating a device during an endoscope or an ultrasound examination. After the diagnosis, a key image including a region of interest and the like to be included in a report is acquired from the acquired examination image. Since the criteria and rules for the key images to be included in the report differ depending on the facility or the doctor, the doctor himself/herself selects the key image from a large number of examination images captured at the time of diagnosis.

Checking the acquired examination images one by one and specifying the key image including the region of interest such as a lesion take time and labor and burden the doctor. Therefore, techniques are being developed to support easy acquisition of key images.

Specifically, WO2009/008125A (corresponding to US2010/182412A1) describes that a frame image of a part such as bleeding is automatically highlighted, and that the front and back of an image frame selected by a user in a list display are reproduced.

SUMMARY OF THE INVENTION

In WO2009/008125A, a frame image of a part such as bleeding is automatically highlighted to facilitate a user to specify a key image candidate. Further, by displaying the front and back of the image frame selected by the user, it is easy to specify a similar image suitable for the key image more than the key image candidate selected by the user. However, in a case where the automatically displayed image does not include an image having the feature desired by the user, the burden may not be reduced.

It is assumed that a plurality of images are automatically selected for a report from a group of images captured during the examination after the examination performed by a doctor is completed. Although key image candidates are automatically selected by learning the diagnostic usefulness and report format, there are problems such as selection of inappropriate images due to inference errors, inability to reflect doctor's preferences, and inability to deal with special examinations and the like. Therefore, it is indispensable for a doctor to check the selection result, but in a case where the burden of this work is large, there arises a problem that the work burden is not reduced as a result.

An object of the present invention is to provide a medical image processing apparatus and an operation method thereof that can reduce the work performed by a doctor with respect to a selection result in a case where a key image to be included in a report is automatically selected.

According to an aspect of the present invention, there is provided a medical image processing apparatus comprising a processor, in which the processor is configured to: acquire a plurality of medical images; classify the medical images into at least one of a plurality of categories; display, on a screen, at least one of the plurality of medical images based on a result of the classification as an automatically selected image; receive an input from a user to select an image requiring reselection as a key image from among the displayed automatically selected images as a selected image; and switch and display, as a switching image, a non-automatically selected image other than the automatically selected image among the plurality of medical images classified into the categories, instead of displaying the selected image.

It is preferable that the processor is configured to switch and display the switching image from the selected image according to the plurality of categories.

It is preferable that the processor is configured to switch and display the switching image classified into the same category as the selected image.

It is preferable that the processor is configured to: display, on a screen, a plurality of switching candidate images that are candidates for the switching image; and receive a user input for determining the switching image from the plurality of displayed switching candidate images.

It is preferable that the switching candidate images include images of the same category as the selected image.

It is preferable that the processor is configured to take into consideration imaging conditions of the medical images in selecting the switching image from the plurality of medical images according to the categories of the automatically selected images.

It is preferable that the processor is configured to take into consideration diagnostic usefulness of the medical images in selecting the switching image from the plurality of medical images according to the categories of the automatically selected images.

It is preferable that the processor is configured to display each image by adding character or symbol information corresponding to the category.

It is preferable that the processor is configured to change a display mode of each image according to the category.

It is preferable that the processor is configured to display the switching image and the automatically selected image in different modes.

It is preferable that the processor is configured to: receive an input to approve each image to be displayed on the screen as the key image; and display the images in different modes depending on whether or not approval has been received.

It is preferable that the processor is configured to classify images using a trained CNN model obtained by training using an image group including a plurality of medical images.

It is preferable that the category is information about a part of a subject.

It is preferable that the category is information about whether or not the image includes a region of interest.

It is preferable that the category is information about whether or not the image includes a treatment tool or about a type of the treatment tool included.

It is preferable that the category is information about a spraying state of a coloring agent or a dyeing agent in an image.

According to another aspect of the present invention, there is provided an operation method of a medical image processing apparatus, the operation method comprising: a step of acquiring a plurality of medical images; a step of classifying the medical images into at least one of a plurality of categories; a step of displaying, on a screen, at least one of the plurality of medical images based on a result of the classification as an automatically selected image; a step of receiving an input from a user to select an image requiring reselection as a key image from among the displayed automatically selected images as a selected image; and a step of switching and displaying, as a switching image, a non-automatically selected image other than the automatically selected image among the plurality of medical images classified into the categories, instead of displaying the selected image.

The present invention reduces a burden on a user in selecting an image to be used as a report by the user from among a large number of medical images, and supports report creation.

DESCRIPTION OF THE PREFERRED EMBODIMENTS

First Embodiment

Figure 2:
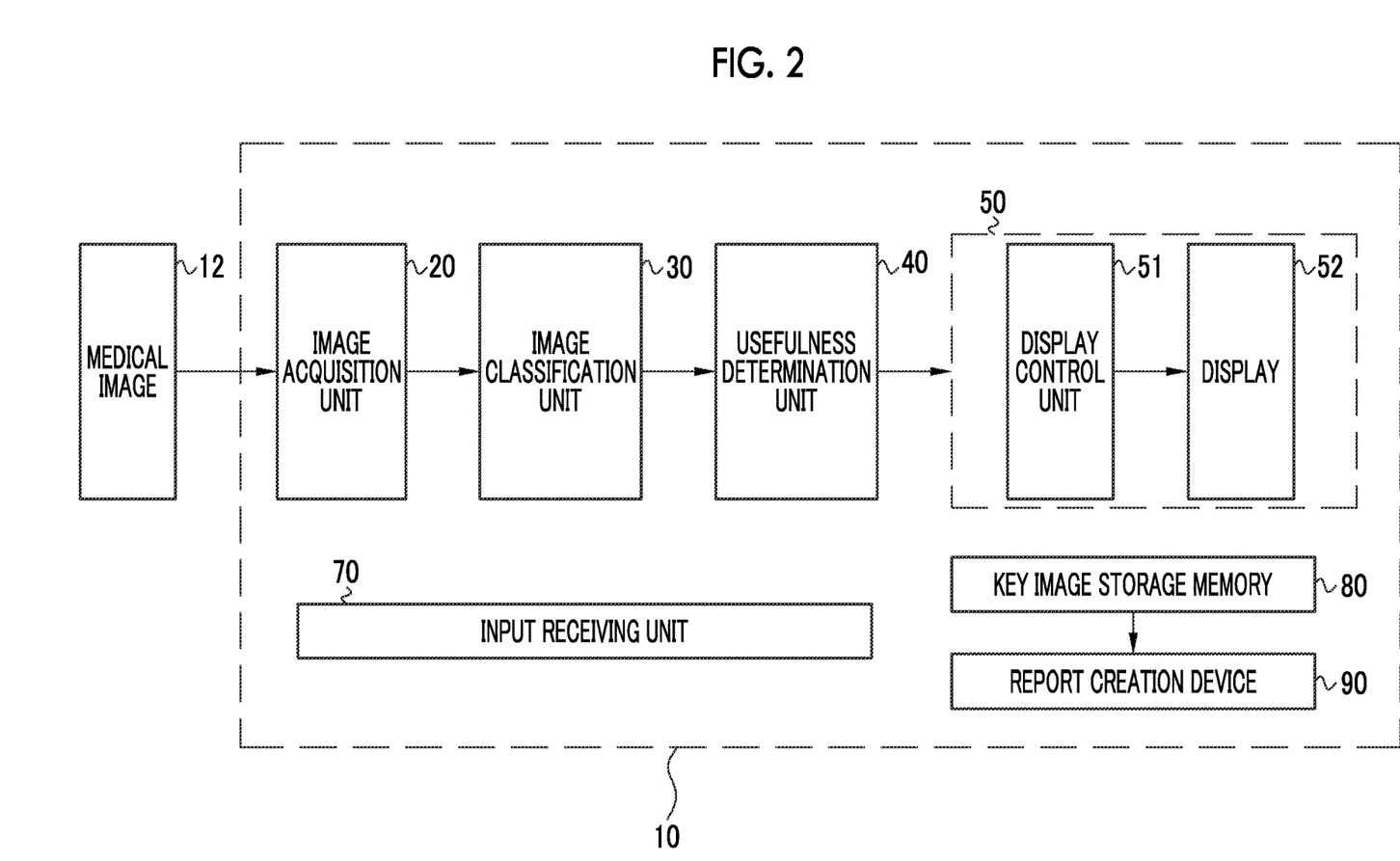
FIG. 2 is a block diagram showing a function of the medical image processing apparatus.

In a medical image processing apparatus 10, programs related to various types of processing are incorporated in a program memory (not shown). The medical image processing apparatus 10 is provided with a central control unit (not shown) configured by a processor. By executing the program in the program memory by the central control unit, functions of an image acquisition unit 20, an image classification unit 30, a usefulness determination unit 40, an image display unit 50, a display control unit 51, an input receiving unit 70, a key image storage memory 80, and a report creation device 90 are implemented.

The image acquisition unit 20 acquires a plurality of medical images 12 from an endoscope system 11 and transmits the plurality of medical images 12 to the image classification unit 30. A key image 13 to be used for creating a report is found from among the medical images 12. The key image 13 is an image to be posted in a report, in which an examination result is transmitted at a glance, and it is preferable that features such as lesions are clear.

The image classification unit 30 extracts image information of the medical images 12 transmitted from the image acquisition unit 20 to acquire category information and calculate image quality information. The medical images 12 are classified into each category according to the acquired category information. The category to be classified is any one or a combination thereof, such as an imaging part, the presence or absence or type of a lesion, a usage state of a treatment tool, and a spraying state of a coloring agent. In the image quality information, information such as brightness, noise, and a degree of blurring of the image is acquired and attached to the medical image 12. The image information is extracted using a trained convolutional neural network (CNN) model. The trained CNN model is obtained by training using an image group including at least a plurality of medical images 12. It is preferable that the category information and the image quality information acquired at the time of imaging by the endoscope system 11 and attached to the medical image 12 have priority over the information extracted by the trained CNN model. The medical images 12 after category classification are transmitted to the usefulness determination unit 40.

The usefulness determination unit 40 determines the diagnostic usefulness of the medical image 12 based on the classification result and the image quality information obtained by the image classification unit 30. The higher the diagnostic usefulness, the higher the likelihood that the image is suitable as the key image 13. The evaluation of usefulness is represented by, for example, a graded evaluation. It can be evaluated that the medical image 12 having an item such as a lesion in the classification result of the category and having a low degree of blurring in the image quality evaluation is highly useful. In a case where there is no category information, the degree of blurring is large, the lightness is too high, or the lightness is too low, the usefulness is low. The medical image 12 for which the determination of usefulness has been completed is transmitted to the image display unit 50. The usefulness is evaluated, and the evaluation threshold value can be freely set by the user.

In the image display unit 50, the medical image 12 transmitted from the usefulness determination unit 40 by the display control unit 51 is displayed on a display 52 according to the classified categories.

The input receiving unit 70 receives user inputs such as image selection for switching display, page change, switching of embodiments, category display switching, layout change, and key image storage.

In the key image storage memory 80, the key image 13 used for the report is stored.

The report creation device 90 uses the key image 13 to create a report of the examination result. It is preferable that the creation of the report is automatically performed after the acquisition of the key image 13.

Figure 1:
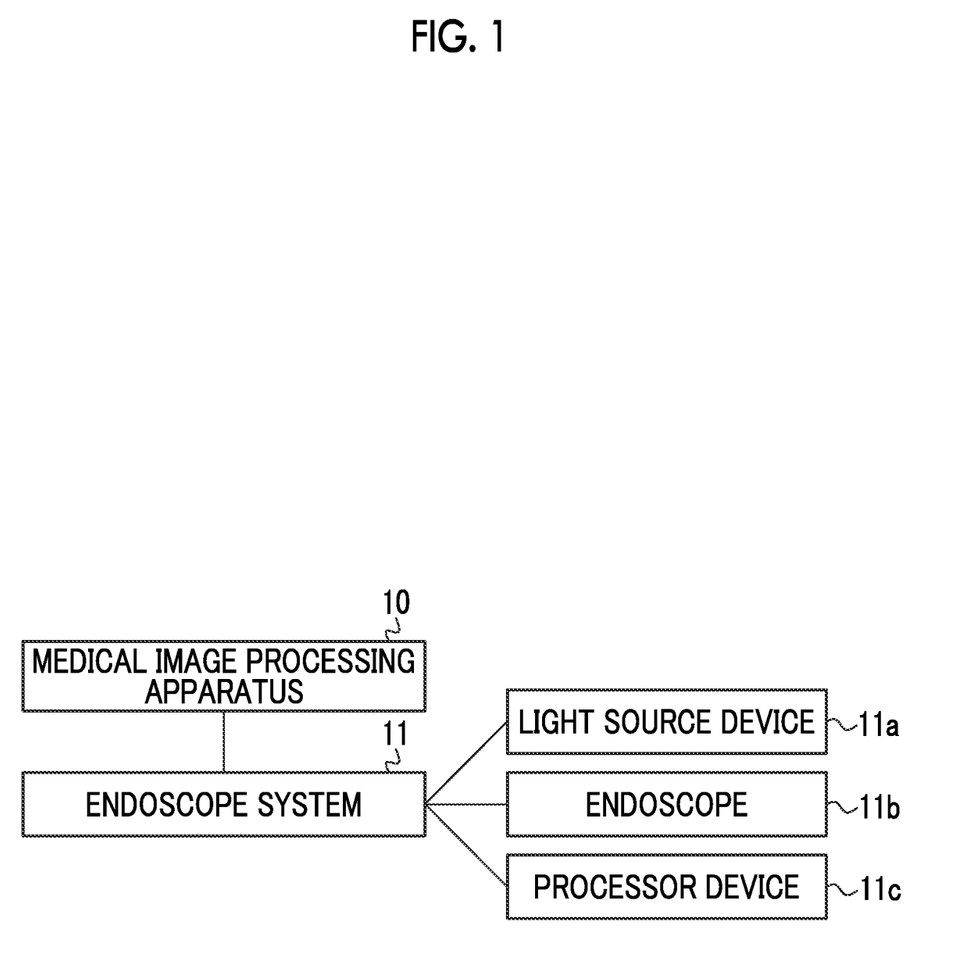
FIG. 1 is a schematic diagram showing a device connected to a medical image processing apparatus.

As shown in FIG. 1, the endoscope system 11 acquires a large amount of medical images 12 by using a light source device 11a, an endoscope 11b, and a processor device 11c. The endoscope system 11 is connected to the medical image processing apparatus 10, and transmits the acquired medical images 12 to the medical image processing apparatus 10.

As shown in FIG. 2, the medical image 12 transmitted from the endoscope system 11 is received by the image acquisition unit 20 and transmitted to the image display unit 50 via the image classification unit 30 and the usefulness determination unit 40. The image display unit 50 includes the display control unit 51 and the display 52. In the image display unit 50, at least one image of the medical images 12 classified by the image classification unit 30 for each category is selected as an automatically selected image 54. The automatically selected image 54 is an image that is selected according to the results of the category classification and the usefulness determination, and is an image that can be a candidate for the key image 13 to be posted in the report. The automatically selected image 54 is displayed on the display 52. The displayed automatically selected image 54 is approved as the key image 13 through the user input received by the input receiving unit 70, and is stored in the key image storage memory 80.

Figure 3:
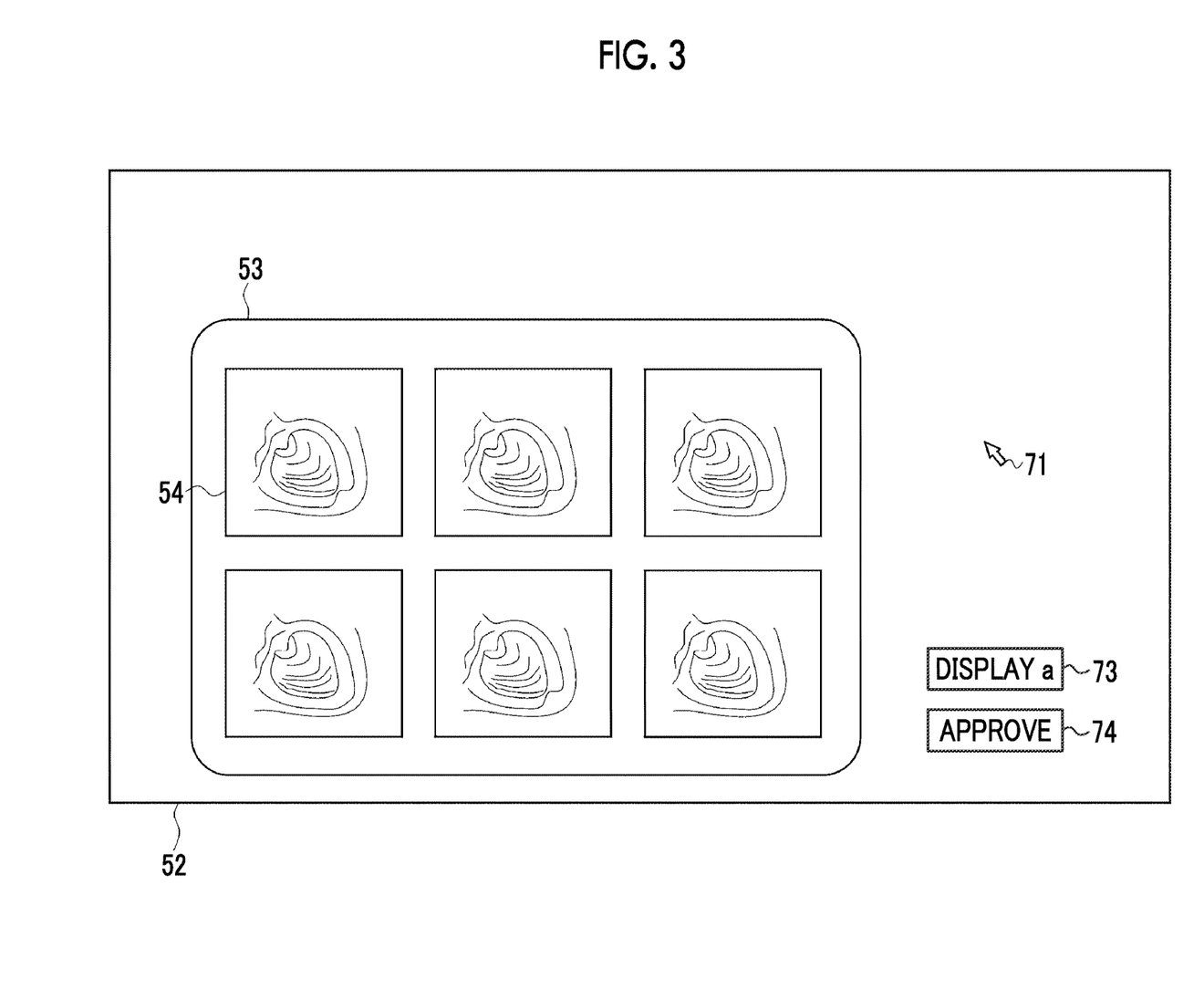
FIG. 3 is an explanatory diagram for displaying an automatically selected image on a display.

As shown in FIG. 3, the acquired medical images 12 are displayed as automatically selected images 54 according to the categories classified on the display 52. The display 52 is provided with an image display field 53, and in the image display field 53, the automatically selected images 54 are displayed in a list. The automatically selected images 54 are preferably selected to include all of the predetermined categories, and the automatically selected images 54 displayed in the list are those that have been evaluated as having a certain level of usefulness or more, and are preferably arranged in order of time when the images were acquired. The display 52 includes a cursor 71, a display switching button 73, and an approval button 74 that reflect a user operation such as a mouse operation.

Figure 4:
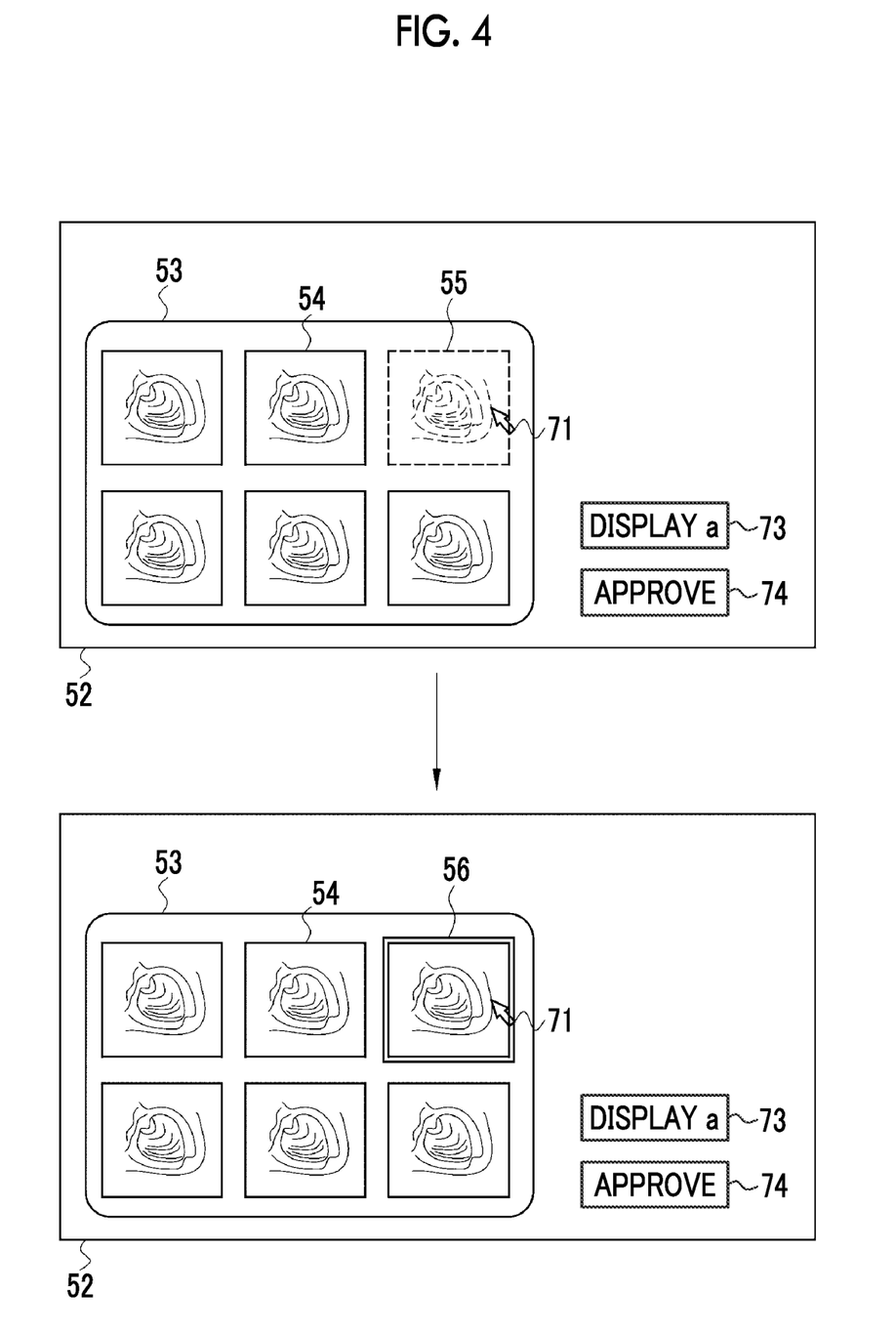
FIG. 4 is an explanatory diagram in which an image requiring reselection is selected as a key image, and the image is switched and displayed.

As shown in FIG. 4, in a case where the key image 13 includes an image requiring reselection from among the automatically selected images 54 listed in the image display field 53 of the display 52 in the first embodiment, the image requiring reselection is set as a selected image 55 via the cursor 71 with a mouse operation or the like. The selected image 55 switches and displays an image automatically selected from the image group that is not displayed in a list as a switching image 56 based on the category information. Note that the image requiring reselection as the key image 13 is an image in which the approval of the key image 13 is suspended at the determination of the user and is temporarily hidden. In addition, there is a case where the display is restored after the display is switched to the switching image 56.

The images to be selected as the switching images 56 include "an image of the same imaging part as the selected image 55", "an image of a part close to the imaging part of the selected image 55", "an image in which a treatment tool is not used in a case where the selected image 55 is using the treatment tool", "an image in which a coloring agent is not sprayed in a case where the selected image 55 is spraying a coloring agent", "an image in the same light source mode as the selected image 55", and the like. In addition, the switching image 56 may be selected in consideration of information about the imaging time of the image, the imaging mode (enlarged or non-enlarged, or the like), or diagnostic usefulness based on the image quality evaluation. Specifically, examples thereof include "an image having a close imaging time", "an image having a low degree of blurring", and "an image having an appropriate lightness". In the image display field 53, it is preferable that the switching image 56 emphasize the frame of the image so that the switching display can be discriminated at a glance. Note that the approval of the key image 13 by selecting the approval button 74 is performed collectively for the displayed images. In a case where it is not necessary to perform the switching display, all of the initially displayed automatically selected images 54 are approved as the key images 13 as they are.

Figure 5:
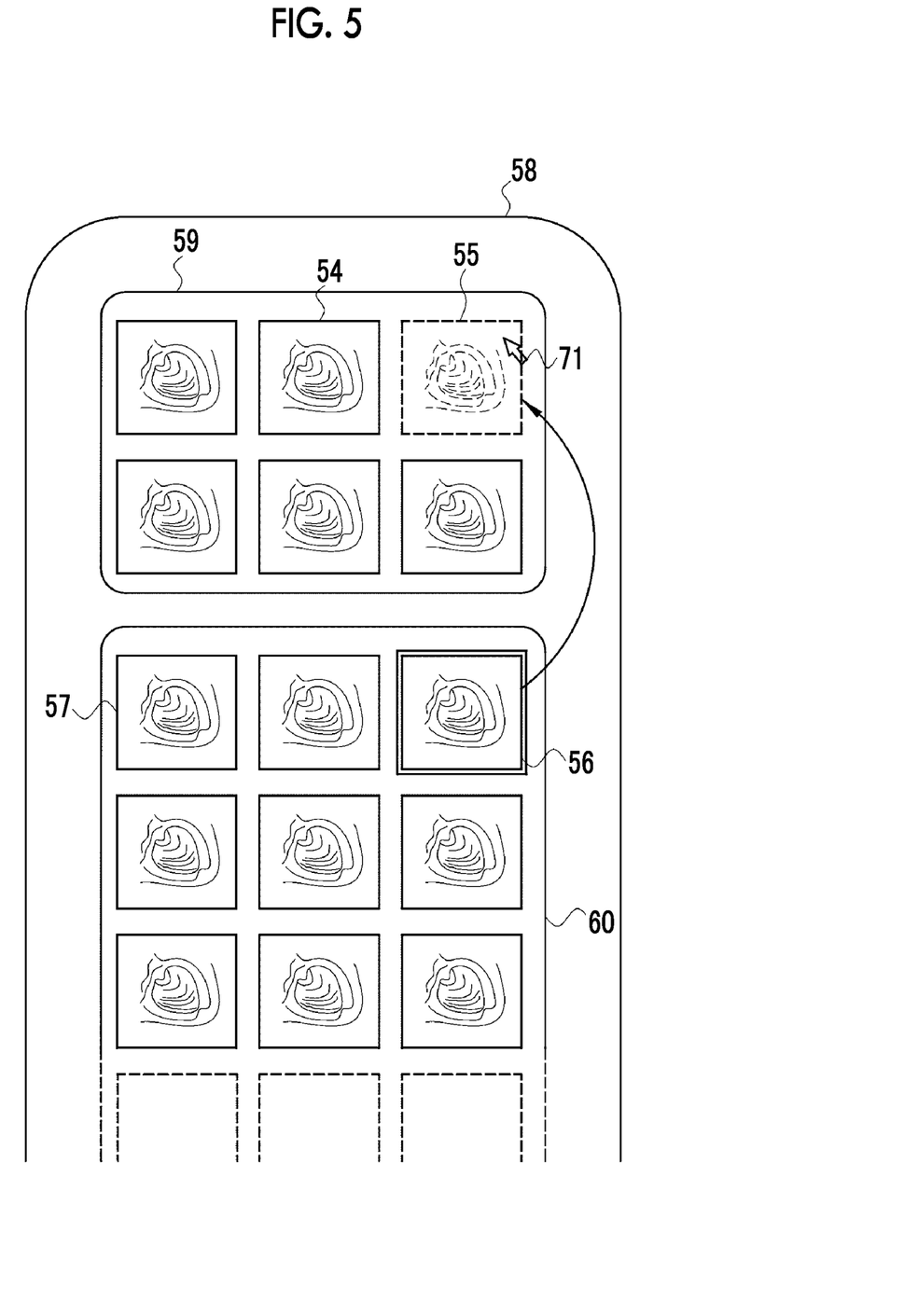
FIG. 5 is a conceptual diagram showing a case where an image is switched and displayed on a display.

FIG. 5 is a conceptual diagram showing changes in display switching between the selected image 55 and the switching image 56. In a case where the selected image 55 is selected by the user, the display control unit 51 detects the switching image 56 to be switched and displayed from the category in which the selected image 55 is classified, the attached image quality information, and the like. The switching image 56 is detected from among non-automatically selected images 57 other than the automatically selected image 54 among the medical images 12 classified by the image classification unit 30 for each category. In FIG. 5, a category-classified image group 58 is composed of an automatically selected image group 59 including the automatically selected images 54 obtained by automatic selection and a non-automatically selected image group 60 not selected as the automatically selected images 54. The switching image 56 is automatically selected from the non-automatically selected image group 60.

In a case where both the automatically selected image 54 and the switching image 56 listed in the image display field 53 of the display 52 are approved as the key image 13, the approval button 74 is selected. In a case where the approval button 74 is selected, the images displayed in the list are collectively stored as the key images 13 in the key image storage memory 80 and are also transmitted to the report creation device 90, and each key image 13 is used for report creation.

Figure 6:
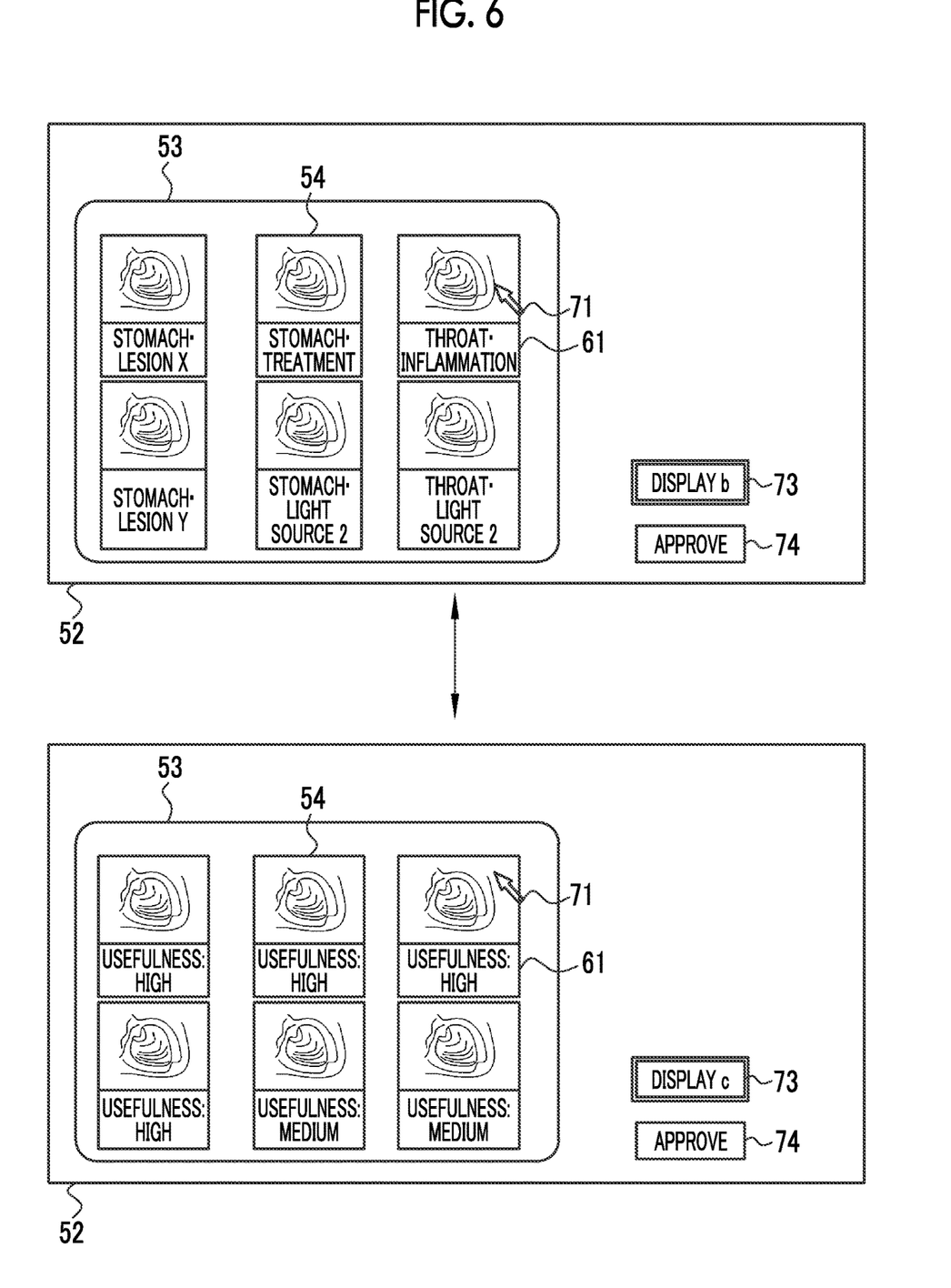
FIG. 6 is an explanatory diagram for displaying information about categories and usefulness attached to a display image.

FIG. 6 illustrates a display mode of the automatically selected image 54 and the switching image 56 displayed in the image display field 53. The display control unit 51 visualizes category information and displays the category information in association with each image. Also, the display may be turned on/off or the information to be displayed may be switched by the display switching button 73. For example, assuming that the normal display is "display a", in "display b", an image information display field 61 is expanded at the lower part of each image displayed in the image display field 53, and the category in which each image is classified is displayed as a character. Further, in "display c", the evaluation of the usefulness calculated by the usefulness determination unit 40 is displayed in the image information display field 61. A more appropriate selection of the key image 13 can be achieved by utilizing the above display forms. In addition, a form in which the above display forms are combined may be provided for display.

Figure 7:
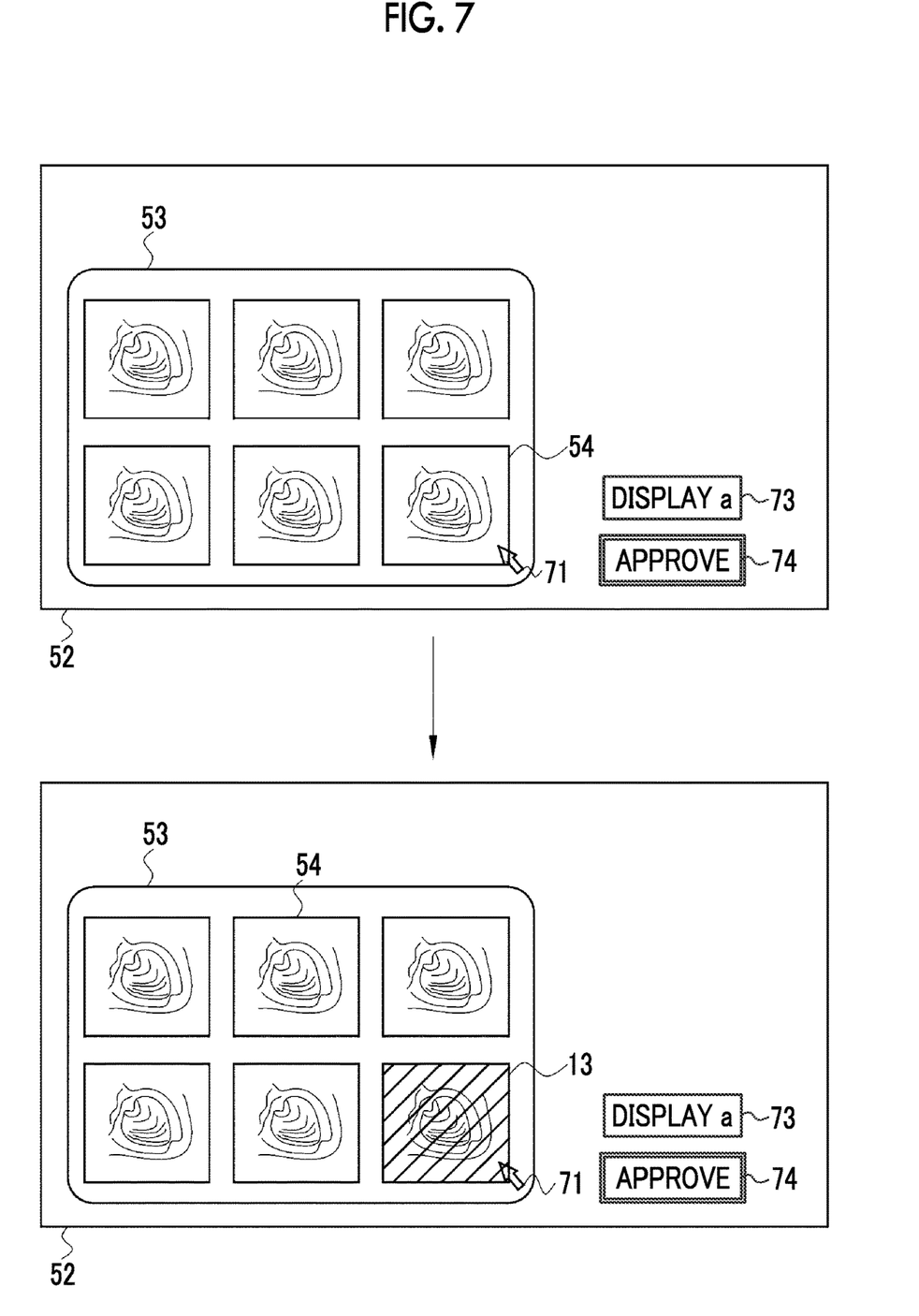
FIG. 7 is an explanatory diagram for distinguishing display of approved images in a case where key image approval is individually performed.

Another pattern of approval processing by the approval button 74 will be described with reference to FIG. 7. Although the approval processing for the key image 13 is performed collectively for the images 54 in the image display field 53, the approval processing may be performed for each of the displayed images one by one. In that case, it is necessary to display the approved image and the unapproved image to distinguish them from each other. For example, a display pattern such as shading, surrounding the image, or placing a mark on the image to which the approval processing has been performed is used so that the approval processing can be recognized at a glance.

Figure 8:
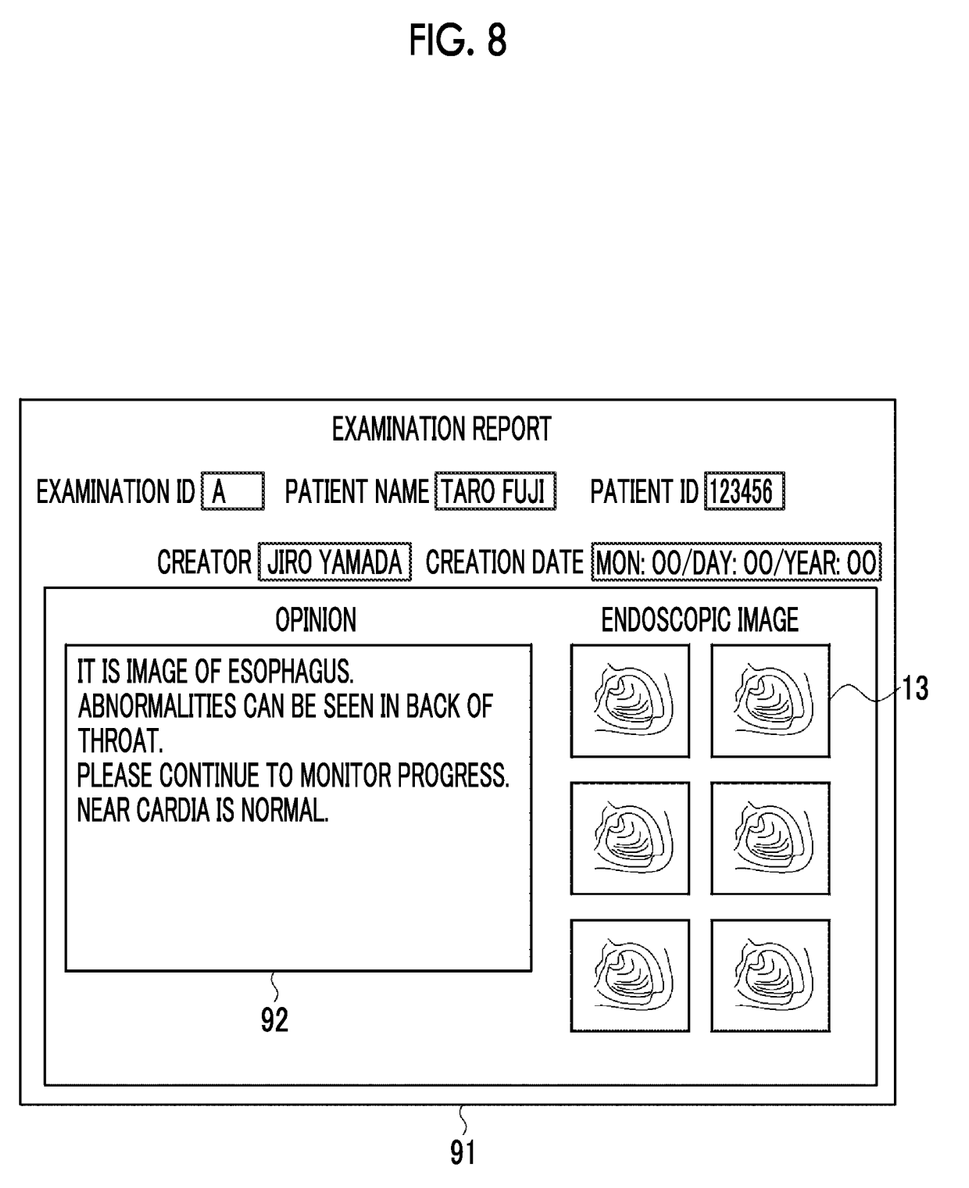
FIG. 8 is an explanatory diagram of a report creation screen using a key image.

As shown in FIG. 8, the key image 13 to which the approval processing has been performed is transmitted to the report creation device 90 and is used for creating a report 91. After the end of the approval processing, the screen display of the display 52 is switched from the image display field 53 to the report 91, and the user can create the report 91 immediately after the approval of the key image 13. Patient information, user information, and the like that have been input in advance are automatically input in the report 91. The user inputs an opinion in an opinion input field 92 and creates a report.

Second Embodiment

Figure 9:
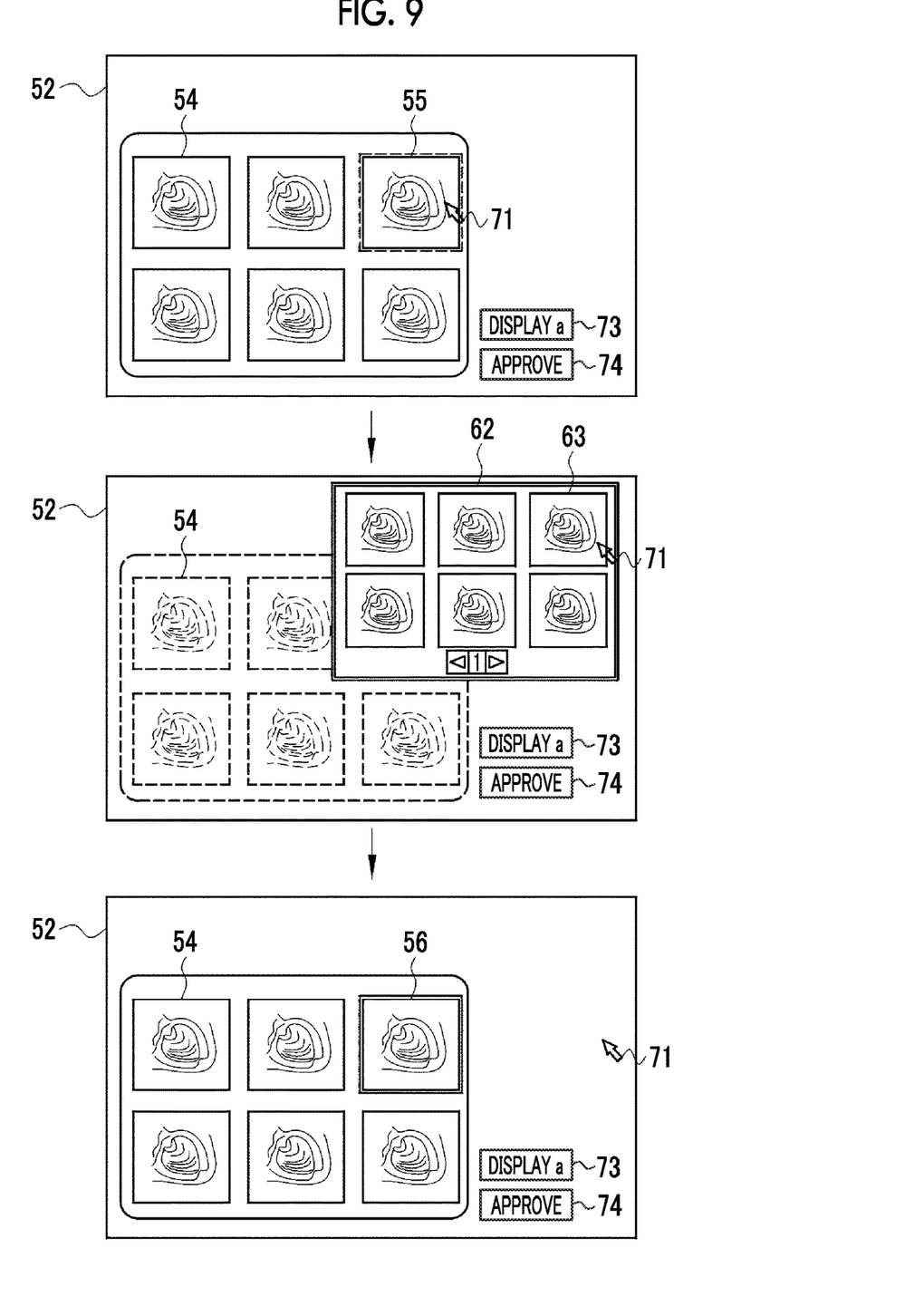
FIG. 9 is an explanatory diagram using a switching candidate image display field in a second embodiment.

In a second embodiment, in the switching from the selected image 55 to the switching image 56, a plurality of switching candidate images 63 are displayed in a case where the selected image 55 is selected instead of the automatic switching, and the user selects any switching image 56 from among the plurality of switching candidate images 63. Contents common to the first embodiment will be omitted.

As shown in FIG. 9, in the second embodiment, similarly to the first embodiment, the user selects the selected image 55 that needs to be reselected in the category-classified state. In a case where the user selects the selected image 55, a switching candidate image display field 62 for displaying the plurality of switching candidate images 63 in a list on the display 52 instead of switching and displaying the switching image 56 is expanded, and the user selects the switching image 56 from among the plurality of switching candidate images 63. In a case where the switching image 56 is selected, expansion of the switching candidate image display field 62 ends, and the selected image 55 and the switching image 56 are switched. Thereby, the key image 13 that more reflects the preference of the user can be selected for the report as compared with the first embodiment. The switching candidate image 63 is a part of the image group selected based on the category of the selected images 55 instead of displaying all the medical images 12 that are not displayed in a list.

The image group of the switching candidate image 63 displayed in the switching candidate image display field 62 includes "an image group of the same imaging part as the selected image 55", "an image group of a part close to the imaging part of the selected image 55", "an image group in which a treatment tool is not used in a case where the selected image 55 is using the treatment tool", "an image group in which a coloring agent is not sprayed in a case where the selected image 55 is spraying a coloring agent", and the like. In addition, instead of displaying all the medical images 12 that match the above conditions, the image group to be displayed as the switching candidate images 63 may be configured to be limited to a predetermined number of the medical images 12 and displayed. Accordingly, the number of sheets to be checked at the time of selection is limited, so that the work burden can be further reduced. In addition, a predetermined number of images may be selected in consideration of the imaging time of the image, the imaging mode, or the diagnostic usefulness based on the image quality evaluation.

Figure 10:
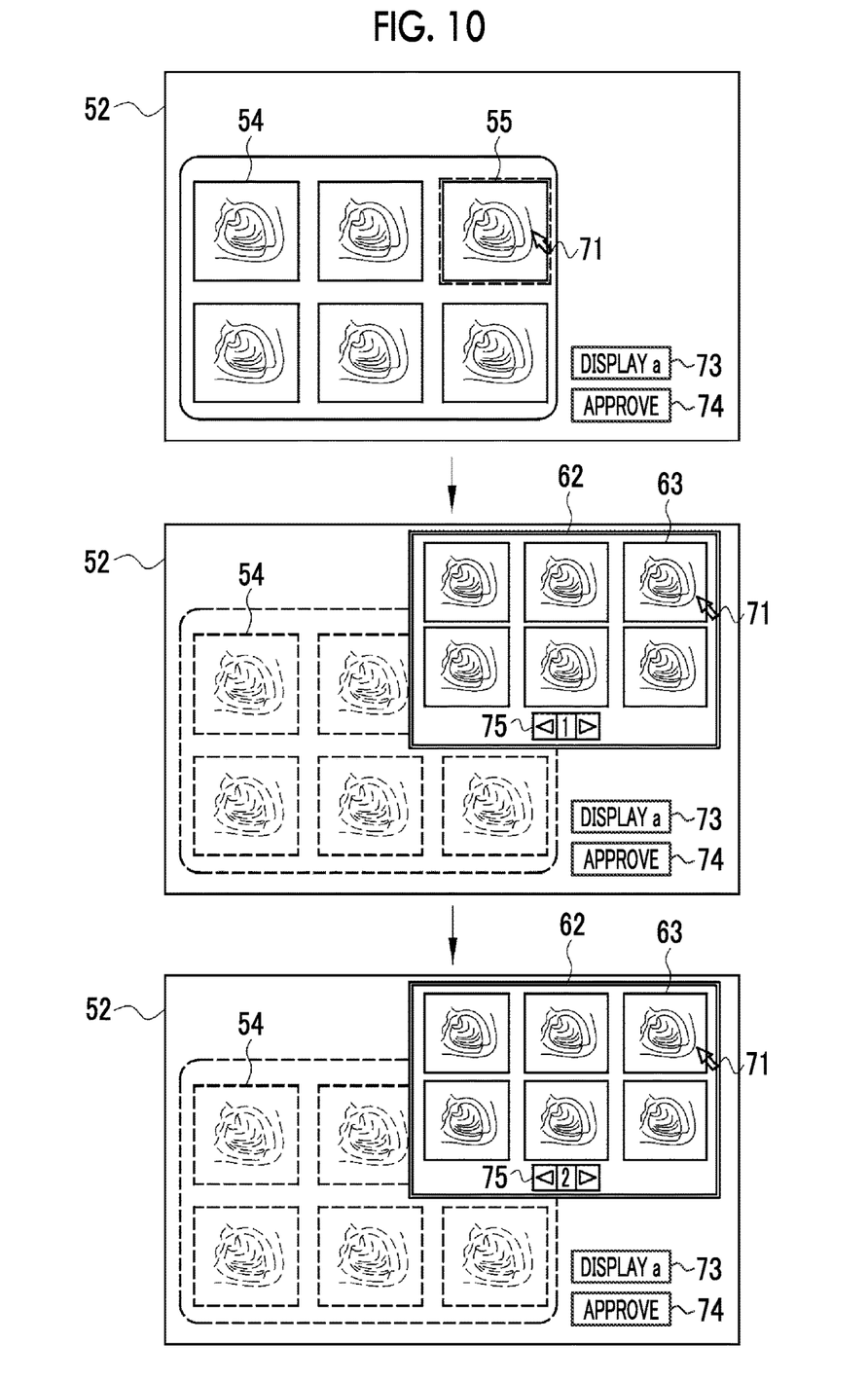
FIG. 10 is an explanatory diagram showing page switching of a switching candidate image display field.

As shown in FIG. 10, the switching candidate image 63 displayed in a list can further display another switching candidate image 63 by operating a page switching button 75 provided on the switching candidate image display field 62 in the same manner. There are two types of the page switching button 75, "forward" and "back", and the user optionally operates the button to switch pages. Also, it is preferable that a displayed page number is described in the central portion of the page switching button. It is preferable that the images to be displayed by page switching are displayed from the image in which the category is the same as that of the switching candidate image 63 and which is determined to be highly useful.

Figure 11:
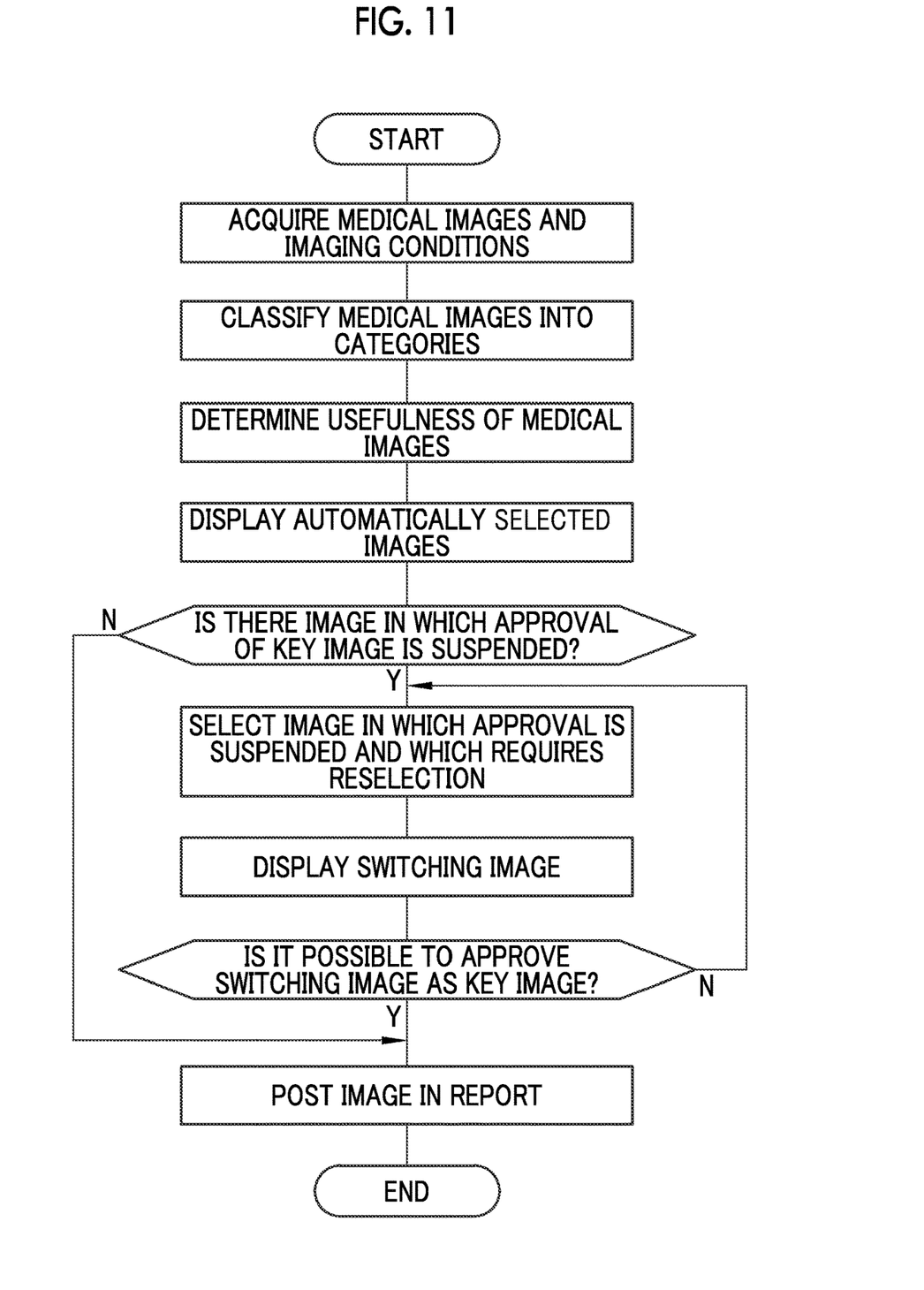
FIG. 11 is a flowchart showing a series of flows of switching and displaying a selected image as a switching image.

FIG. 11 is a flowchart showing a series of flows of switching and displaying the selected image as the switching image. The medical image processing apparatus 10 acquires the medical images 12 captured by the endoscope system 11 by the image acquisition unit 20. The acquired medical images 12 are transmitted to the image classification unit 30 and are classified into categories.

The image classification unit 30 extracts image information of the medical images 12, attaches the extracted image information to the original medical images 12 as category information and image quality information, and classifies each medical image 12 into a predetermined category based on the category information. The image information is extracted using a trained convolutional neural network (CNN) model. The medical images 12 after category classification are transmitted to the usefulness determination unit 40.

The usefulness determination unit 40 determines the usefulness from the category information and the image quality information of the medical images 12, and attaches the determination result to the original medical images 12. The medical images 12 after usefulness determination are transmitted to the image display unit 50.

The image display unit 50 displays the medical images 12 in a list on the display 52 as automatically selected images 54 according to the results of the category classification and the usefulness determination. It is preferable that the images to be displayed in the list are selected to include all the predetermined categories and have a high evaluation in the determination of usefulness.

The user observes whether or not the key image 13 includes an image requiring reselection from among the automatically selected images 54 displayed in the list, in a case where there is an image requiring reselection, selects the image, and switches and displays the image to another image. In a case where there is no image requiring reselection, the approval button 74 is selected.

It is preferable that the switching image 56, which is switched and displayed, is selected according to the category and usefulness of the selected image 55 and has high usefulness.

The reselection of the switching image 56 is repeated until the switching image 56 can be approved as the key image 13. In a case where there are no more images to be reselected among the images displayed in the list, the approval button 74 is selected.

After the approval button is selected, the key image 13 is transmitted to the key image storage memory 80 and to the report creation device 90.

In the above embodiments, hardware structures of processing units for executing various kinds of processing, such as the image acquisition unit 20, the image classification unit 30, the usefulness determination unit 40, the image display unit 50, the display control unit 51, the input receiving unit 70, the key image storage memory 80, and the report creation device 90, are various processors shown below. The various processors include a central processing unit (CPU) as a general-purpose processor functioning as various processing units by executing software (program), a programmable logic device (PLD) as a processor of which the circuit configuration can be changed after manufacturing such as a graphical processing unit (GPU) or a field programmable gate array (FPGA), a dedicated electrical circuit as a processor having a circuit configuration designed exclusively for executing various kinds of processing, and the like.

One processing unit may be configured by one of various processors, or may be configured by a combination of the same or different kinds of two or more processors (for example, a combination of a plurality of FPGAs, a combination of a CPU and an FPGA, a combination of a CPU and a GPU, or the like). In addition, a plurality of processing units may be configured by one processor. As an example of configuring a plurality of processing units via one processor, first, as represented by a computer, such as a client or a server, there is a form in which one processor is configured by a combination of one or more CPUs and software, and this processor functions as a plurality of processing units. Second, as represented by a system on chip (SoC) or the like, there is a form of using a processor for realizing the function of the entire system including a plurality of processing units with one integrated circuit (IC) chip. Thus, various processing units are configured by using one or more of the above-described various processors as hardware structures.

More specifically, the hardware structure of these various processors is an electrical circuit (circuitry) in the form of a combination of circuit elements, such as semiconductor elements. The hardware structure of the storage unit is a storage device such as a hard disc drive (HDD) or a solid state drive (SSD).

EXPLANATION OF REFERENCES

10: medical image processing apparatus
11: endoscope system
11a: light source device
11b: endoscope
11c: processor device
12: medical image
13: key image
20: image acquisition unit
30: image classification unit
40: usefulness determination unit
50: image display unit
51: display control unit
52: display
53: image display field
54: automatically selected image
55: selected image
56: switching image
57: non-automatically selected image
58: category-classified image group
59: automatically selected image group
60: non-automatically selected image group
61: image information display field
62: switching candidate image display field
63: switching candidate image
70: input receiving unit
71: cursor
73: display switching button
74: approval button
75: page switching button
80: key image storage memory
90: report creation device
91: report
92: opinion input field

What is claimed is:

1. A medical image processing apparatus comprising a processor,
wherein the processor is configured to:
acquire a plurality of medical images;
acquire category information from the plurality of medical images;
classify the plurality of medical images into at least one of a plurality of categories based on the category information;
calculate image quality information for the plurality of medical images;
determine diagnostic usefulness of the plurality of medical images based on a result of the classification and the image quality information;
automatically select at least one of the plurality of medical images for each of the plurality of categories based on the result of the classification and the usefulness determination;
display the at least one automatically selected image on a screen, wherein the at least one automatically selected image is a candidate for a key image that is to be included in a report;
receive an input from a user to select an image from the displayed at least one automatically selected image which requires reselection as the candidate for the key image;
switch the selected image to an image other than the automatically selected image among the plurality of medical images classified into the categories, by taking into consideration the diagnostic usefulness of the plurality of medical images according to the categories of the automatically selected images; and
display the switching image instead of displaying the selected image.

2. The medical image processing apparatus according to claim 1,
wherein the processor is configured to switch and display the switching image from the selected image according to the plurality of categories.

3. The medical image processing apparatus according to claim 1,
wherein the processor is configured to switch and display the switching image classified into the same category as the selected image.

4. The medical image processing apparatus according to claim 1,
wherein the processor is configured to:
display, on a screen, a plurality of switching candidate images that are candidates for the switching image; and
receive a user input for determining the switching image from the plurality of displayed switching candidate images.

5. The medical image processing apparatus according to claim 4,
wherein the switching candidate images include images of the same category as the selected image.

6. The medical image processing apparatus according to claim 1,
wherein the processor is configured to take into consideration imaging conditions of the medical images in selecting the switching image from the plurality of medical images according to the categories of the automatically selected images.

7. The medical image processing apparatus according to claim 1,
wherein the processor is configured to take into consideration diagnostic usefulness of the medical images in selecting the switching image from the plurality of medical images according to the categories of the automatically selected images.

8. The medical image processing apparatus according to claim 1,
wherein the processor is configured to display each image by adding character or symbol information corresponding to the category.

9. The medical image processing apparatus according to claim 1,
wherein the processor is configured to change a display mode of each image according to the category.

10. The medical image processing apparatus according to claim 1,
wherein the processor is configured to display the switching image and the automatically selected image in different modes.

11. The medical image processing apparatus according to claim 1,
wherein the processor is configured to:
receive an input to approve each image to be displayed on the screen as the key image; and
display the images in different modes depending on whether or not approval has been received.

12. The medical image processing apparatus according to claim 1,
wherein the processor is configured to classify images using a trained CNN model obtained by training using an image group including a plurality of medical images.

13. The medical image processing apparatus according to claim 1,
wherein the category is information about a part of a subject.

14. The medical image processing apparatus according to claim 1,
wherein the category is information about whether or not the image includes a region of interest.

15. The medical image processing apparatus according to claim 1,
wherein the category is information about whether or not the image includes a treatment tool or about a type of the treatment tool included.

16. The medical image processing apparatus according to claim 1,
wherein the category is information about a spraying state of a coloring agent or a dyeing agent in an image.

17. An operation method of a medical image processing apparatus, the operation method comprising:
a step of acquiring a plurality of medical images;
a step of acquiring category information from the plurality of medical images;
a step of classifying the plurality of medical images into at least one of a plurality of categories based on the category information;
a step of calculating image quality information for the plurality of medical images;
a step of determining diagnostic usefulness of the plurality of medical images based on a result of the classification and the image quality information;
a step of automatically selecting at least one of the plurality of medical images for each of the plurality of categories based on the result of the classification and the usefulness determination;
a step of displaying the at least one automatically selected image on a screen, wherein the at least one automatically selected image is a candidate for a key image that is to be included in a report;
a step of receiving an input from a user to select an image from the displayed at least one automatically selected image which requires reselection as the candidate for the key image;
a step of switching the selected image to an image other than the automatically selected image among the plurality of medical images classified into the categories, by taking into consideration the diagnostic usefulness of the plurality of medical images according to the categories of the automatically selected images; and
a step of displaying the switching image instead of displaying the selected image.

* * * * *